UNITED STATES PATENT OFFICE.

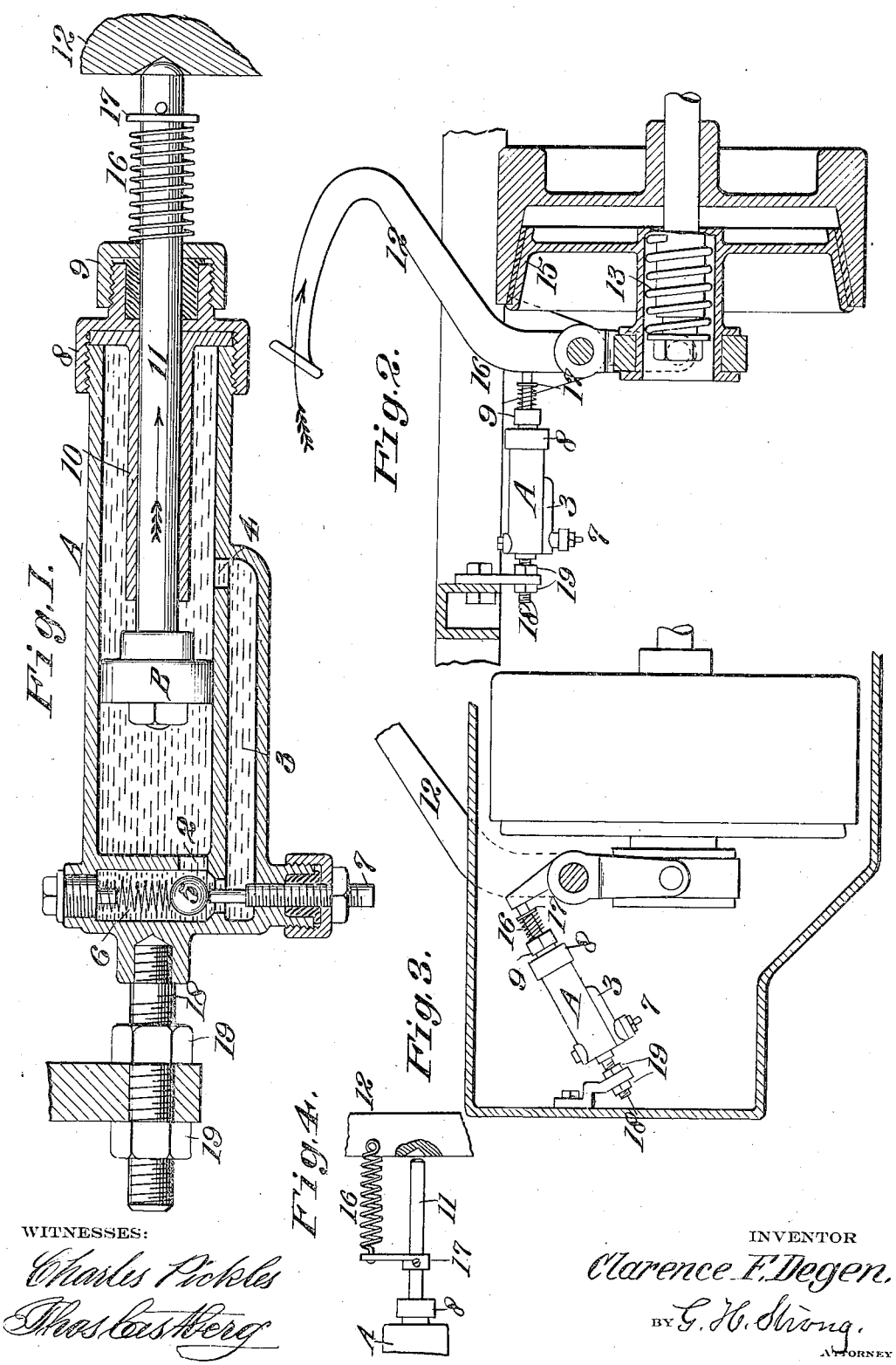

CLARENCE F. DEGEN, OF OAKLAND, CALIFORNIA.

AUTOMATIC AUTOMOBILE CLUTCH-ENGAGING DEVICE.

1,165,230.  Specification of Letters Patent.  Patented Dec. 21, 1915.

Application filed February 23, 1915. Serial No. 9,954.

*To all whom it may concern:*

Be it known that I, CLARENCE F. DEGEN, a citizen of the United States, residing at Oakland, in the county of Alameda and State of California, have invented new and useful Improvements in Automatic Automobile Clutch-Engaging Devices, of which the following is a specification.

My invention relates to a device which is especially applicable to the control of the clutch between the motor and the transmission gearing of an automobile, and for similar purposes, so that an abrupt engagement and consequent shock and strain of gearing may be avoided when shifting the gears to change the relative rate of speed of the machine.

It consists of a cylinder containing a liquid, a piston movable therein, a transfer passage for the liquid and a valve to regulate the rate of flow of the liquid from one side to the other of the piston, and connections between the cylinder and the gear box and between the piston and the clutch actuating lever, whereby the unclutching movement may be rapidly effected while the clutch engagement may be made gradual, so as to prevent sudden shock.

It also includes details of construction and adjustment which will be more fully explained by reference to the accompanying drawings, in which—

Figure 1 is an axial section of the cylinder, showing the connecting parts. Fig. 2 is a partial sectional view showing one form of clutch and the application. Fig. 3 is a similar view showing the cylinder in a different position. Fig. 4 is a detail view showing the application of the pull string to return the piston to normal position.

Difficulty is often experienced in changing transmission gears to produce different speeds, and my invention is designed to insure such an easy engagement of the clutch members as will prevent shock and strain upon the moving parts controlled thereby.

In the drawings, A is a cylinder and B a piston fitting and movable therein.

2 is a port, here shown connected with a passage 3 which extends from the bottom of the cylinder alongside, and up to a point above the piston where it connects by a port 4 with the interior of the cylinder, so that a liquid which the cylinder contains may be transferred from one side to the other of the piston by its movement. The rate of this transfer in one direction may be controlled by a valve 5 closable upon a seat in the direction of flow, by a spring 6, and the degree of closing is controlled by an adjusting screw 7 which may hold the valve away from its seat to any desirable distance. The opening of the valve allows a free movement of the piston in the opposite direction.

8 is the cylinder cap and 9 is a stuffing box through which and the sleeve 10 the piston rod 11 is slidable. The sleeve 10 forms a stop to limit the free outward movement of the piston when released from foot lever pressure. The outer end of the piston rod contacts with the foot lever 12.

13 is a spring, the tension of which normally acts to close and engage the clutch members 15 so as to transmit power from the motor to the parts to be driven. One end of the spring is suitably connected with the foot lever and the other end with one member of the clutch 15 so that when the lever is moved in the direction of the arrow, as in Fig. 2, it acts to relieve the pressure on the spring and thus withdraw and release the clutch. A light spring 16 surrounds the piston rod, one end pressing against the stuffing box cap and the other end against a collar or stop pin 17 fixed to the piston rod, as shown. When the foot lever is moved outward to release the clutch, the spring 16 acting against the collar 17 moves the piston from the position shown in Fig. 1 into contact with sleeve 10 which limits the piston movement in that direction; the liquid moving freely through the passage 3 and opening 2 to the rear side of the piston. When the foot lever is released, it presses against the piston in an effort to return said piston, but the incompressible liquid moving slowly through the valve controlled opening at 5 resists this movement and thus prevents the instant engagement of the clutch members by the action of the powerful spring 13. This retardation of the engagement of the clutch members for a very short interval of time is sufficient to prevent the sudden jerk which would be caused if this control was not effected. The distance to which the piston may move in the cylinder, and the interval through which this slow engagement takes place, is regulated by adjusting the cylinder nearer to or farther from the rest position of the foot lever when the clutch is in engagement. This may be effected by means of a bolt or coupling 18 with some fixed part and adjusting nuts 19.

Having thus described my invention, what I claim and desire to secure by Letters Patent is—

1. In a device of the character described, a clutch, a spring by which the clutch members are engaged, a lever by which the clutch is disengaged, a liquid containing cylinder having a transfer passage between its ends, a piston movable in the cylinder, a piston rod, and a spring normally acting to project the piston rod into the path of the lever, when said lever is moved to engage the clutch whereby the engagement of the clutch is retarded.

2. In a device of the character described, a clutch, an engaging spring, a spring compressing and clutch disengaging lever, a liquid containing cylinder with a piston, a piston rod, a spring by which the rod is normally positioned in the path of the lever when the latter is moved to engage the clutch, a support for the rear end of the cylinder, and an adjusting device connected with the cylinder and with said support to move the cylinder and increase or diminish the movement of the piston therein.

In testimony whereof I have hereunto set my hand in the presence of two subscribing witnesses.

CLARENCE F. DEGEN.

Witnesses:
W. W. HEALEY,
M. E. EWING.